(12) United States Patent
Gosebruch

(10) Patent No.: US 9,579,760 B2
(45) Date of Patent: Feb. 28, 2017

(54) MACHINE FOR MACHINING AND/OR MEASURING A WORKPIECE, COMPRISING TWO PIVOTABLE TRANSVERSE MEMBERS

(75) Inventor: Harald Gosebruch, Ahrensburg (DE)

(73) Assignee: Walter Maschienbau GmbH, Tubingen (DE)

( * ) Notice: Subject to any disclaimer, the term of this patent is extended or adjusted under 35 U.S.C. 154(b) by 718 days.

(21) Appl. No.: 13/981,705

(22) PCT Filed: Jan. 13, 2012

(86) PCT No.: PCT/EP2012/050520
§ 371 (c)(1),
(2), (4) Date: Oct. 9, 2013

(87) PCT Pub. No.: WO2012/100994
PCT Pub. Date: Aug. 2, 2012

(65) Prior Publication Data
US 2014/0021668 A1    Jan. 23, 2014

(30) Foreign Application Priority Data

Jan. 26, 2011   (DE) .......................... 10 2011 000 335

(51) Int. Cl.
*B23Q 7/00*   (2006.01)
*B23Q 1/01*   (2006.01)
(Continued)

(52) U.S. Cl.
CPC .............. *B23Q 7/00* (2013.01); *B23Q 1/012* (2013.01); *B23Q 1/015* (2013.01); *B23Q 1/52* (2013.01);
(Continued)

(58) Field of Classification Search
CPC .............. B24B 21/008; B24B 27/0023; B24B 27/0069; B24B 27/0076; B24B 27/0092;
(Continued)

(56) References Cited

U.S. PATENT DOCUMENTS 2,651,975 A * 9/1953 Soloff ...................... B44B 3/00
144/144.1
2,905,211 A * 9/1959 Weinstein ............ B23Q 37/002
144/48.3
(Continued)

OTHER PUBLICATIONS

Australian Government; IP Australia; Patent Examination Report No. 2; Date of Issue: Jan. 20, 2016.

*Primary Examiner* — Timothy V Eley
(74) *Attorney, Agent, or Firm* — Emch, Schaffer, Schaub & Porcello Co., L.P.A.

(57) ABSTRACT

The invention relates to a machine (10) for machining and/or measuring a workpiece (49). Machine (10) has a machine frame (18), a first transverse member (24) which is rotatably mounted by means of a first round guide (25) about a first rotational axis (D1) on the machine frame (18) and on which a tool unit (11) with a tool (13, 14) is arranged, where the tool (13, 14) is arranged at a distance from the first rotational axis (D1). Machine (10) also has a second transverse member (40) which is rotatably mounted by means of a second round guide (41) about a second rotational axis (D2) on the machine frame (18), and on which a workpiece clamping device (12) is arranged at a distance from the second rotational axis (D2). The two rotational axis (D1, D2) are aligned parallel to one another.

15 Claims, 12 Drawing Sheets

Figure 1:
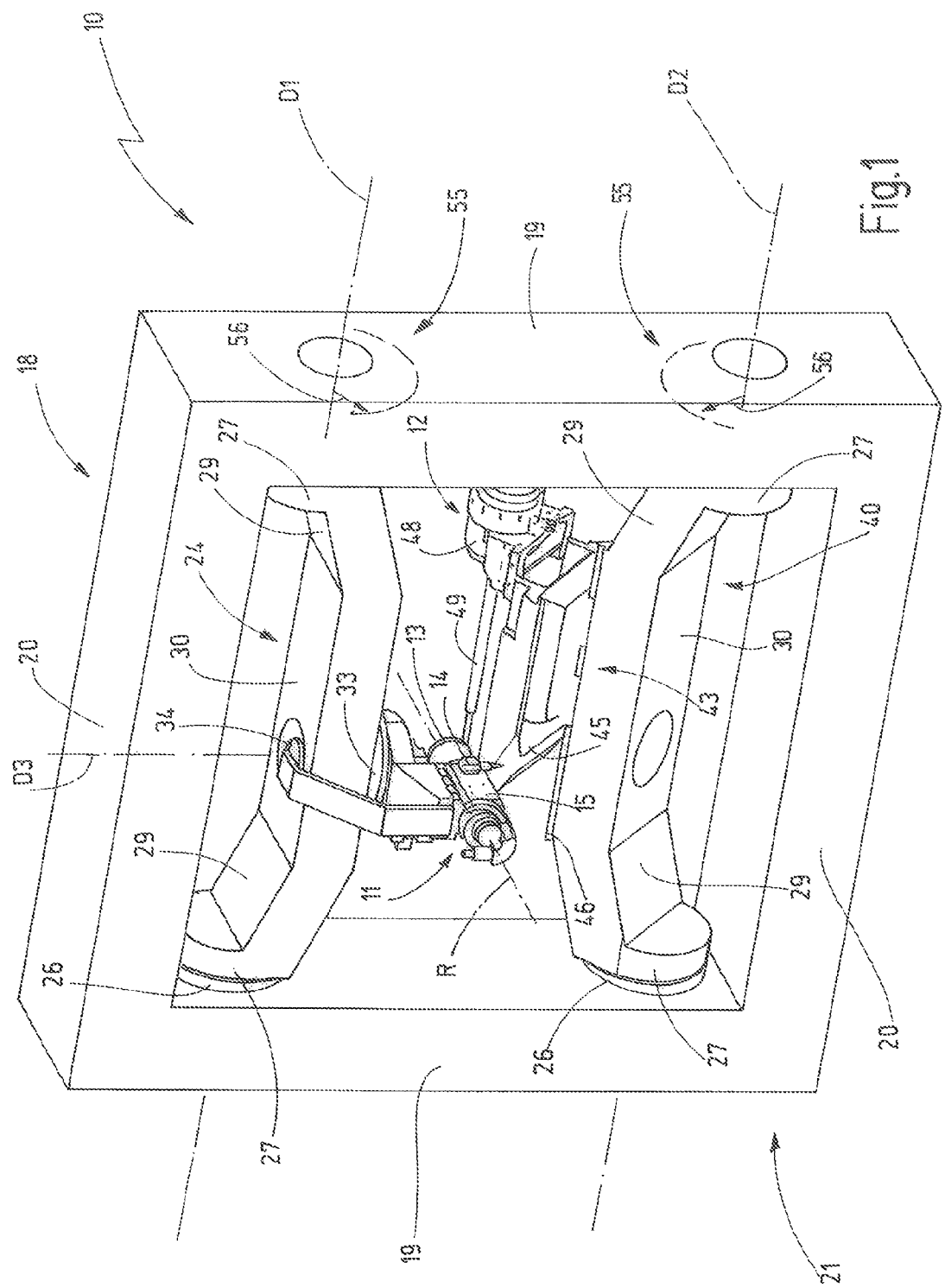

(51) Int. Cl.
*B23Q 1/52* (2006.01)
*B24B 41/02* (2006.01)
*B24B 5/04* (2006.01)

(52) U.S. Cl.
CPC .............. *B24B 5/04* (2013.01); *B24B 41/02* (2013.01); *Y10T 409/305824* (2015.01); *Y10T 409/307672* (2015.01); *Y10T 409/309576* (2015.01)

(58) Field of Classification Search
CPC ..... B24B 27/0015; B24B 27/04; B24B 25/00; B24B 33/081; B24B 41/02; B24B 5/04; B24B 5/045; B24B 5/047; B23B 39/02; B23Q 1/015; B23Q 1/012; B23Q 1/52; B23Q 7/00; Y10T 409/305824; Y10T 409/307672; Y10T 409/309576
See application file for complete search history.

(56) References Cited

U.S. PATENT DOCUMENTS

| | | | |
|---|---|---|---|
| 5,117,552 A * | 6/1992 | Babel | B23Q 1/015 409/235 |
| 5,231,587 A | 7/1993 | Frost | |
| 5,611,137 A | 3/1997 | Braun | |
| 6,347,733 B1 | 2/2002 | Hickey, II | |
| 6,394,892 B2 * | 5/2002 | Hanisch | B23Q 1/52 451/177 |
| 6,682,276 B2 * | 1/2004 | Harami | B23Q 1/4857 160/202 |
| 6,733,217 B2 * | 5/2004 | Schworer | B23Q 1/52 269/57 |
| 6,796,012 B2 | 9/2004 | Geissler | |
| 7,185,412 B2 * | 3/2007 | Penick | B23Q 1/012 29/26 A |
| 7,204,926 B2 | 4/2007 | Lamphere | |
| 7,208,076 B2 | 4/2007 | Kobata | |
| 7,467,449 B1 | 12/2008 | Lee | |
| 7,501,049 B2 | 3/2009 | Schmidt | |
| 7,591,620 B2 | 9/2009 | Schmidt | |
| 7,621,031 B2 * | 11/2009 | Kawai | B23Q 1/4852 198/346.1 |
| 7,645,103 B2 * | 1/2010 | Schmidt | B23Q 1/012 269/58 |
| 7,698,829 B2 * | 4/2010 | Lutz | B23Q 1/0054 33/1 M |
| 7,845,257 B2 * | 12/2010 | Kim | B23Q 1/015 29/27 C |
| 8,291,796 B2 * | 10/2012 | Taira | B23Q 1/015 82/150 |
| 8,769,791 B2 * | 7/2014 | Kawada | B23Q 1/015 29/281.1 |
| 8,899,889 B2 * | 12/2014 | Yoshida | B23Q 1/4857 269/55 |
| 9,162,334 B2 * | 10/2015 | Schuster | B23Q 1/64 |
| 2003/0053875 A1 * | 3/2003 | Pasquetto | B23Q 1/5437 409/192 |
| 2008/0047120 A1 * | 2/2008 | Soroka | B23Q 1/01 29/27 C |
| 2009/0283950 A1 * | 11/2009 | Bernhard | B23Q 1/28 269/59 |

* cited by examiner

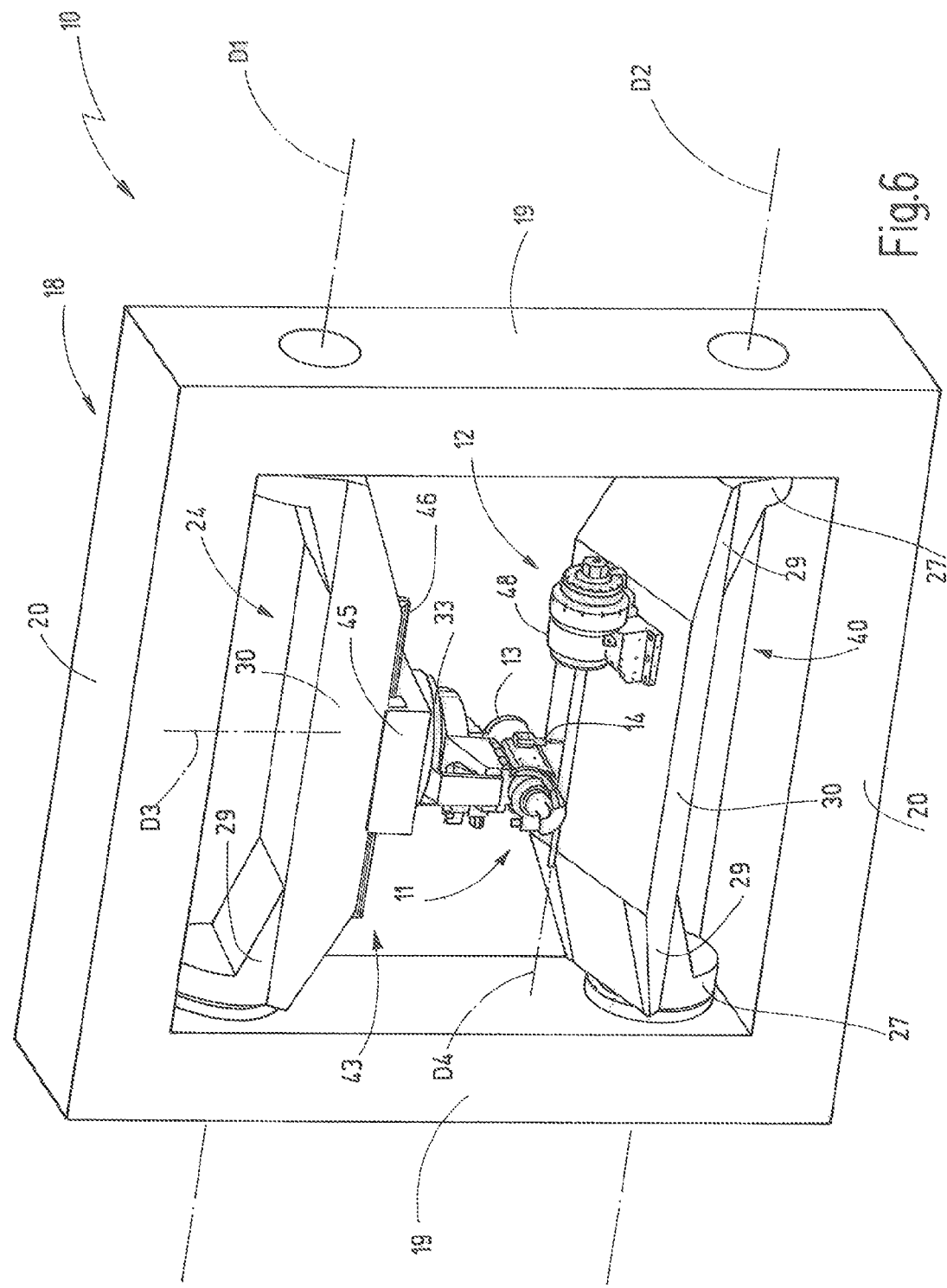

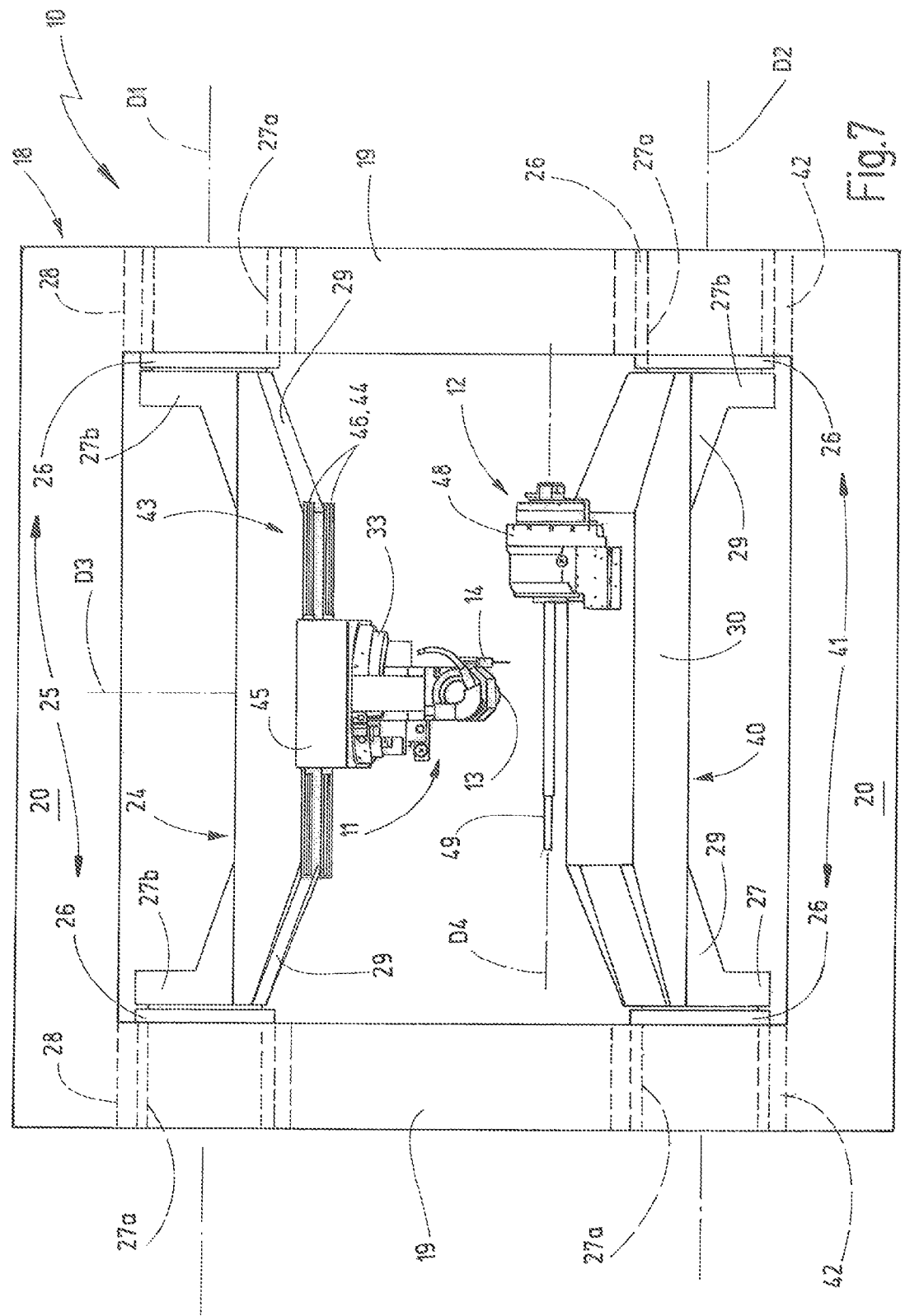

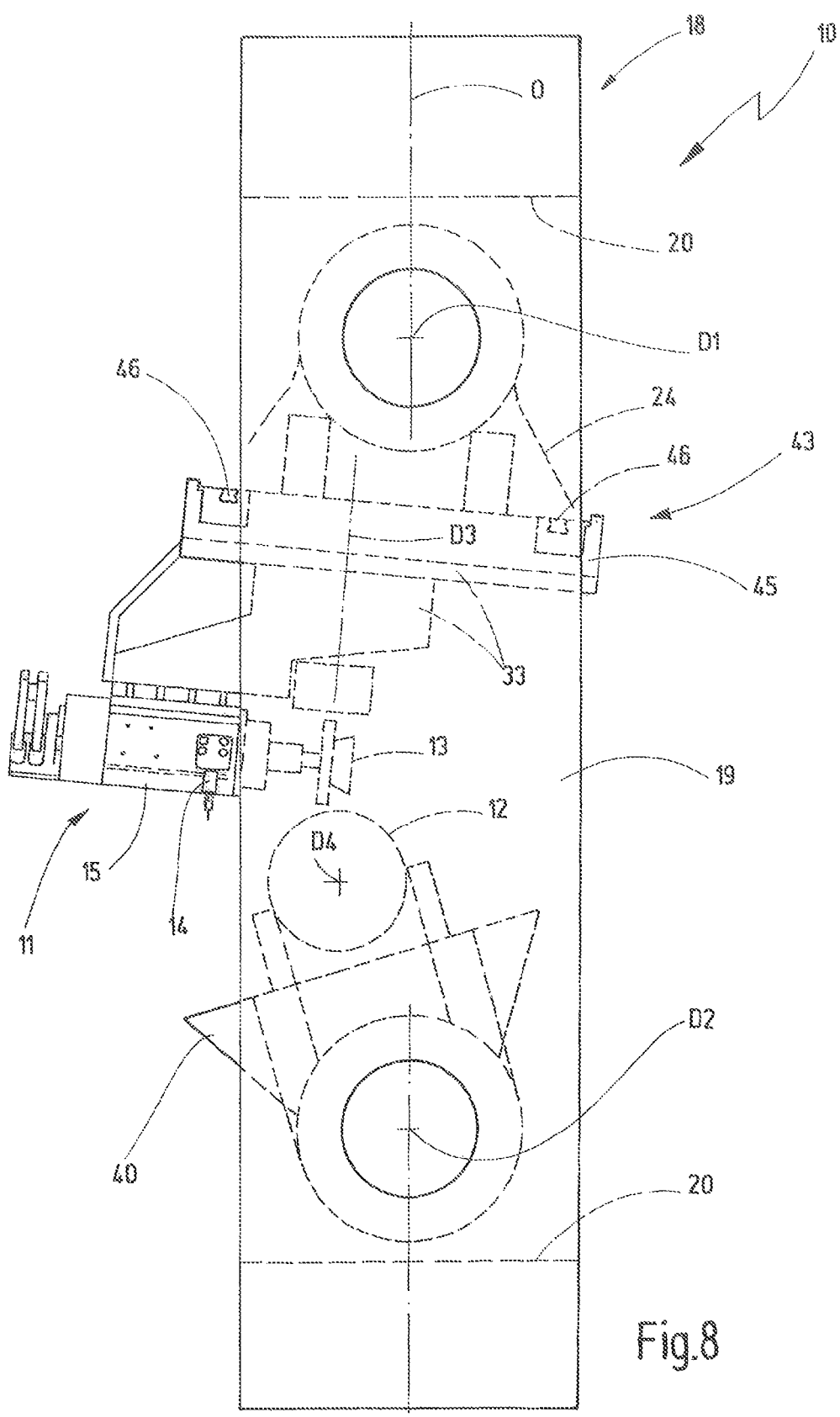

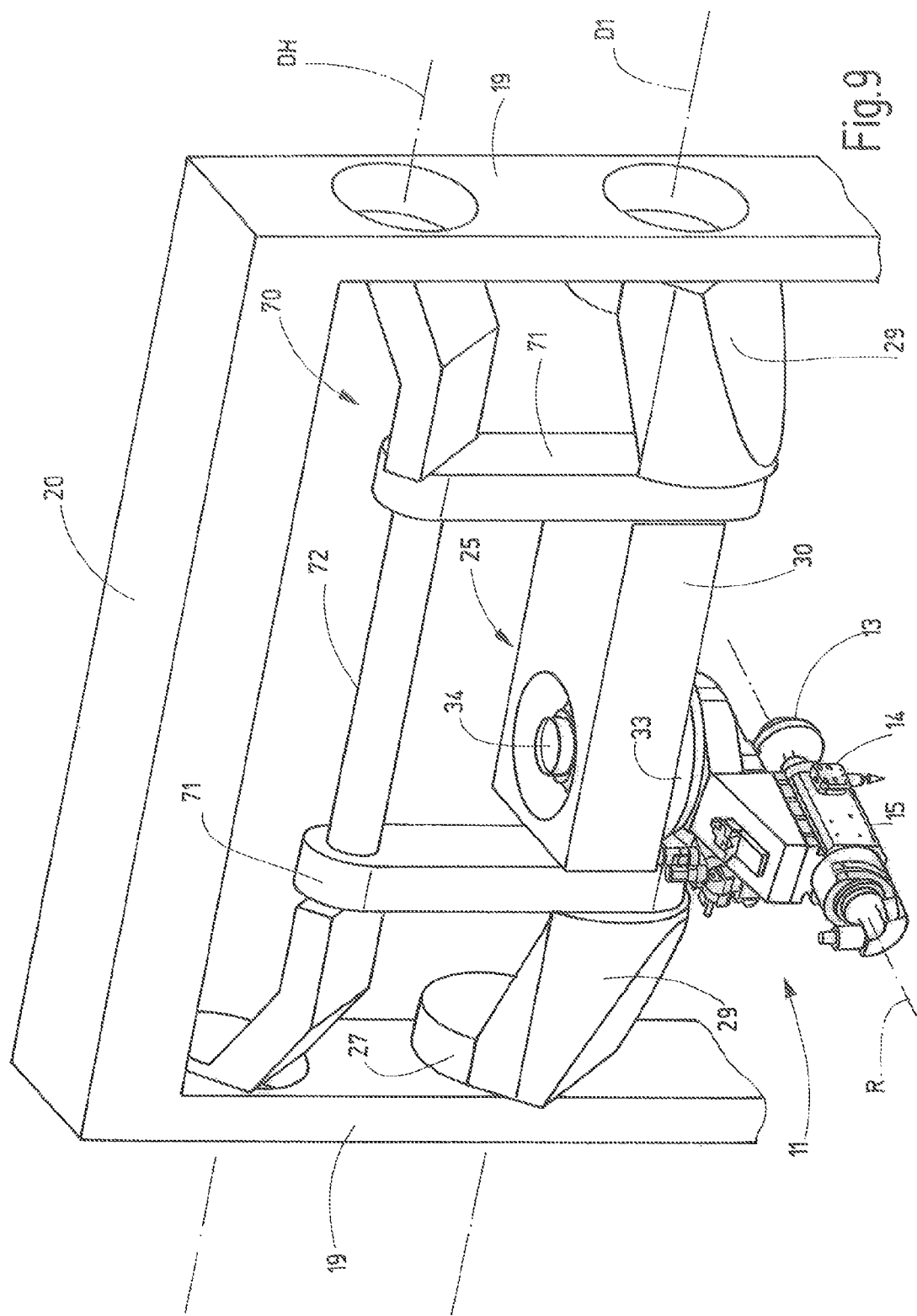

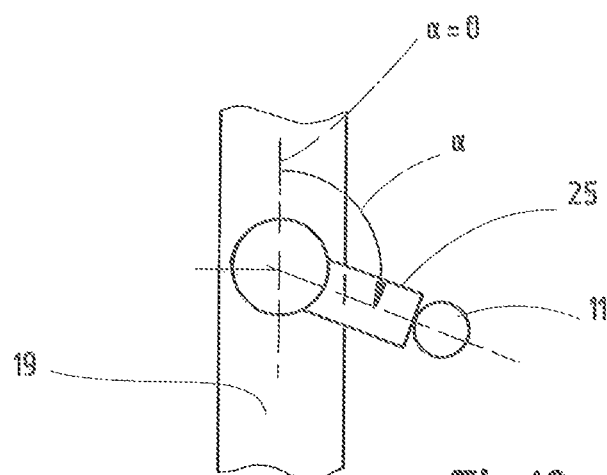
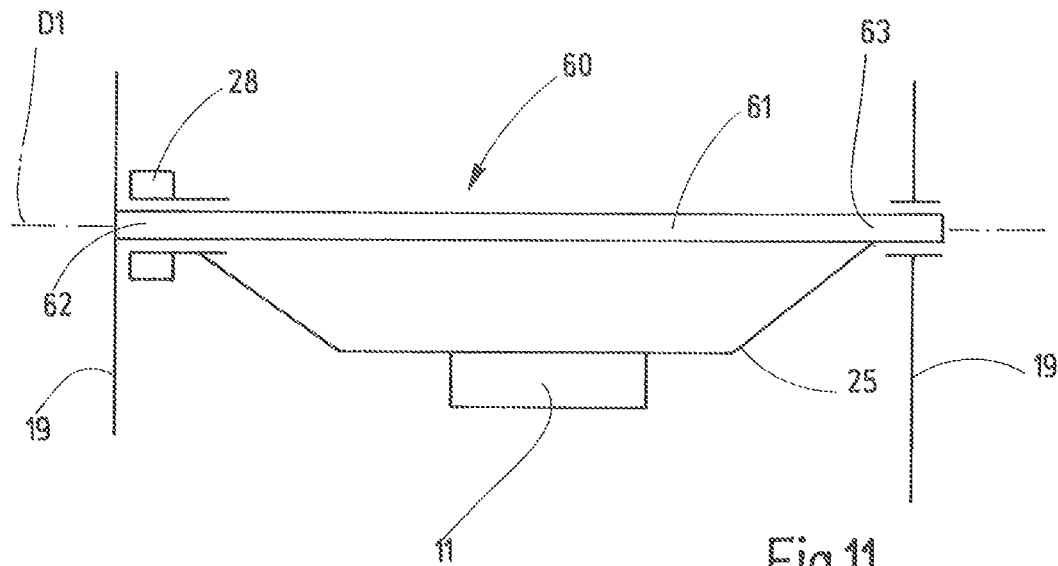
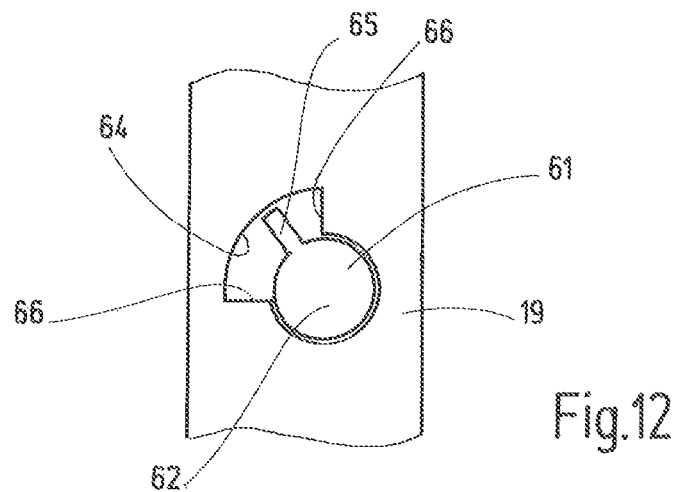

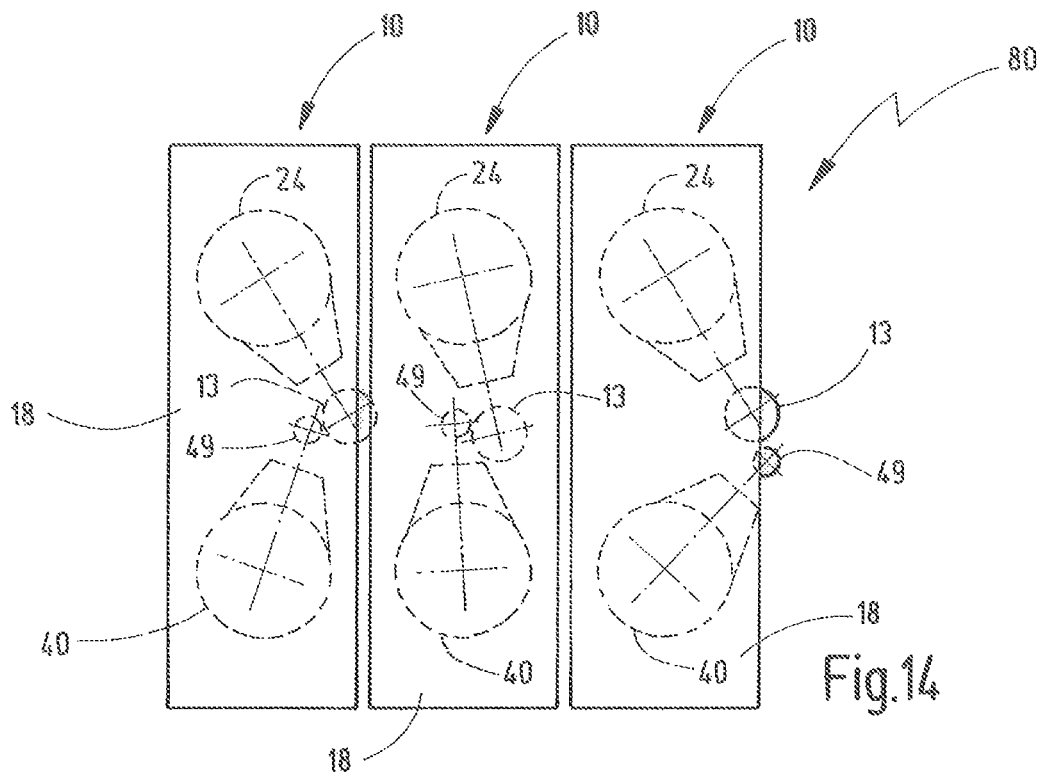
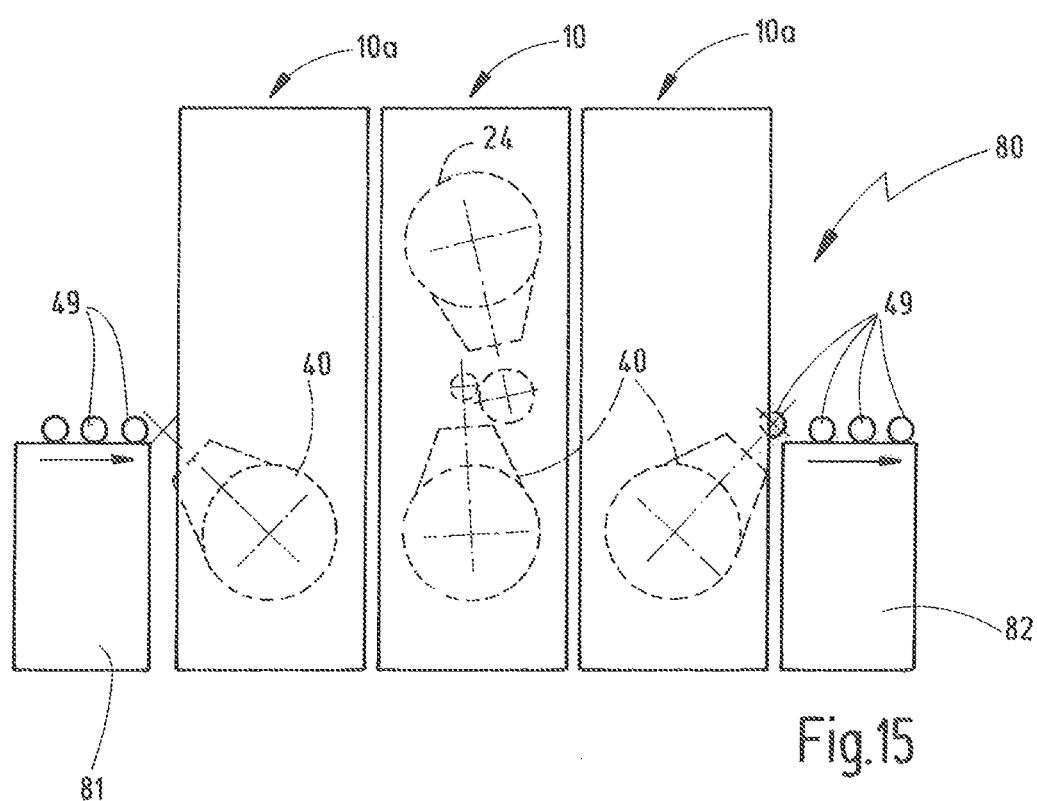

MACHINE FOR MACHINING AND/OR MEASURING A WORKPIECE, COMPRISING TWO PIVOTABLE TRANSVERSE MEMBERS

CROSS REFERENCE TO RELATED APPLICATION

The present patent application is based upon and claims the benefit PCT application no. PCT/EP2012/050520; filed Jan. 13, 2012 and claiming priority date of Jan. 26, 2011.

BACKGROUND OF THE INVENTION

The invention relates to a machine for machining and/or measuring a workpiece. The machine is set up in particular as a machine tool for metal-removing machining of a workpiece. A tool unit of the machine can have a machining tool and/or a measuring tool. Furthermore, a workpiece clamping device for holding a workpiece is provided, where the tool unit and the workpiece clamping device can be moved and/or pivoted relative to one another. In this way, the tool of the tool unit and a workpiece held in the workpiece clamping device can be moved relative to one another and machined and/or measured.

A machine tool for electrochemical machining of metal workpieces is known from DE 10 2004 040 578 B3. The machine tool has a turntable rotatable about a vertical axis. Above the turntable a cross beam is arranged on a machine frame such that it is vertically movable and can pivot about a horizontal rotational axis. The tool is arranged in the form of tool cathodes on the cross beam. These can in turn be arranged on a horizontally movable carriage.

DE 10 2006 034 123 B34 furthermore describes a milling and drilling machine as well as a workpiece table arrangement. The workpiece table arrangement is arranged such that it is horizontally movable on the machine frame. At the same time, it has a transverse member pivotable about a horizontal rotational axis, where the central bar of the transverse member is arranged offset relative to the rotational axis. A tool unit that can move longitudinally along two coordinate axes is arranged above the workpiece table arrangement.

SUMMARY OF THE INVENTION

Starting from these known processing machines, it can be considered as an object of the present invention to provide a machine for machining and/or measuring a workpiece that offers good accessibility to the tool as well as to a workpiece clamping device holding the tool, and which at the same time permits a compact and rigid construction of the machine frame.

This object is achieved by a machine having the features of claim 1.

In accordance with the invention, the machine has a machine frame on which a first transverse member is rotatably mounted about a first rotational axis by a first round guide and a second transverse member is rotatably mounted about a second rotational axis by a second round guide. The two transverse members are arranged at a distance from one another. The distance between the two rotational axes of the transverse members is preferably unchangeable. A tool unit with a machining tool and/or a measuring tool is arranged on the first transverse member, where the tool is at a distance from the first rotational axis, such that when the transverse member rotates about the first rotational axis the tool moves on a first pivoting radius about the first rotational axis. This first pivoting radius is preferably unchangeable for a tool arranged on the tool unit.

A workpiece clamping device for holding a workpiece is arranged on the second transverse member. The workpiece is at a distance from the second rotational axis and moves on a second pivoting radius about the second rotational axis when the second transverse member is rotated. The workpiece preferably has a contour of which at least a part is cylindrical. The distance between the two rotational axes of the transverse members is smaller than the total of the first and second pivoting radii. The tool and the workpiece can be swung towards and away from each other by rotation of the two rotational axes. As a result of the pivoting movement, a relative movement between the tool and the workpiece takes place in two Cartesian coordinate directions at the same time. The number of linear drives required can be minimized as a result of this arrangement. The machine preferably has only a single linear drive. The two transverse members themselves are rotatably mounted only by the two round guides and otherwise cannot move relative to the machine frame.

The number of linear guides can be minimized in this way. At the same time, a very compact yet rigid structure of the machine frame can be achieved. If the tool unit and the workpiece clamping device are swung away from one another, good accessibility is assured both to the tool unit and to the workpiece clamping device.

The plane in which the first and the second rotational axes extend, and which is referred to below as the orientation plane, may be aligned vertically, horizontally or obliquely. A horizontal alignment of the orientation plane can be advantageous for some applications of the machine, for example when the workpieces have a large length to be machined, in particular longer than 350 to 400 mm, or when a horizontal arrangement is advantageous for reasons of automation. The horizontal arrangement of the orientation plane can be suitable for applications with lathes or external cylindrical grinding machines. As an alternative to this, the orientation plane can be aligned vertically, so that the machine's footprint is very small.

The first and the second rotational axes can be arranged horizontally, vertically, or at an incline. The vertical arrangement of the first and second rotational axes offers the advantage that holding the transverse members in a rotational position at any one time requires less torque. If the rotational axes are arranged horizontally, the torque required at any one time to hold the transverse member in the desired position changes depending on the angle of rotation about the rotational axis. For that reason, it can be advantageous to provide an apparatus for at least partial compensation of the torque applied to the round guide in question due to the load of the transverse member. This apparatus can for example, comprise a torsion bar whose torque counteracts an increase in the rotational torque as the transverse member changes its angle of rotation, at least in a working range of the angle of rotation. Other apparatus such as counterweights, spring arrangements and so forth can also be used alternatively or additionally.

The machine frame preferably has one beam, or in particular two beams, aligned in the direction of the orientation plane, on which beam(s) the two transverse members are rotatably mounted by means of their round guides. Depending on the length and on the load to be borne of the transverse members, they are rotatably mounted only at one end or at both ends using the round guide in question. Both transverse members can preferably be pivoted through an angular range of at least 120 degrees and preferably of 180 degrees. It is also possible for the first transverse member and/or the second transverse member to be rotatable through 360 degrees. The angular range can be determined depending on the other requirements at the machine, for example depending on whether and from what direction workpieces and/or tools are infed and exchanged by separate apparatus or manually. The machine has a very high flexibility as a result.

The two transverse members and/or the two round guides assigned to the transverse members can be of identical design, whereby the number of different components in the machine is reduced, and the cost and effort of construction are very low in comparison with former machines. Due to the symmetry of the machine frame and of the two transverse members, the machine's thermal behaviour is very good. Temperature changes in the environment, and thermal changes in length caused as a result, have equal effects on the two rotatable transverse members, so that only very small divergences, if at all, occur in the relative positions of the workpiece and the tool. The design itself thus compensates for thermal changes in length, at least partially.

In a preferred embodiment, the machine frame has a frame in the form of a closed ring containing the two beams on which the transverse members are rotatably mounted. These two beams are connected to one another at each of their ends by cross connectors. The space required by such a machine frame is extremely small, so that free space can be created in the limited floor area of a factory building in comparison with former machines. The frame-like machine frame enclosed by the beams and by the cross connectors can have a very rigid construction with a small space requirement, which is advantageous in particular for high-precision machining or measuring processes such as grinding.

Furthermore, it is advantageous if the machine only has one longitudinal guide which can be activated for infeed movements during machining and/or measurement with a tool, and which can be provided either on the first transverse member for linear movement of the tool unit or on the second transverse member for linear movement of the workpiece clamping device. A linear relative movement between the workpiece and the tool is possible in this way. The linear relative movement is made in particular parallel to the two rotational axes. The further machine axes for infeed movements during the machining or measuring process are formed by round guides. In addition to a longitudinal guide, three to five round guides are provided. Unlike the longitudinal guides, the round guides can more easily be sealed against the ingress of cooling agent, chips or other impurities. Furthermore, round guides can as a rule be constructed in a small space. For this reason the number of linear guides in the machine is minimized.

A guidance means extending substantially parallel to the rotational axis, for example one or more guide rails, is preferably used as the longitudinal guide on which a carriage is movably guided. Either the tool unit or the workpiece clamping device can be arranged on the carriage.

Preferably, only one longitudinal guide is provided. It is however also possible for one of the two transverse members to be designed adjustable, such that the distance between the two rotational axes or between the two transverse members can be changed or adjusted. This adjusting unit for at least one of the transverse members can effect a continuous or stepped change in the distance between the rotational axes and be designed as a linear adjuster. In particular, the adjusting unit can be lockable or engageable, so that inadvertent movement of the two rotational axes or transverse members relative to one another cannot occur during the machining or measuring process. The purpose of the adjusting unit is simply to adapt the distance between the two rotational axes to the tool unit being used and to the workpiece clamping device being used. The purpose of the adjusting unit is thus only to set the machine up, and during machining or measurement using a tool it is not operated and remains without function. Infeed movements between the workpiece and the tool are not made by the adjusting unit.

In a further preferred embodiment, the tool unit is rotatably arranged on the first transverse member about a third rotational axis by means of a third round guide. The third rotational axis extends here in particular approximately at a right angle, and preferably at a distance from the first rotational axis. In a machine tool, particularly in a grinding machine, the tool unit has a tool drive which makes the tool rotate.

Alternatively, the machining tool can be fixed such that it does not move relative to the tool unit, and the workpiece is driven about a rotational axis.

Furthermore, a fourth round guide can be preferably provided on the workpiece clamping device, about which the workpiece clamping device can rotate the workpiece. The fourth rotational axis defined by the fourth round guide extends in particular parallel to the second rotational axis.

The machine frame and/or the two transverse members are preferably made of grey cast iron or cast concrete, for instance a mineral casting. In this way, very good vibration damping properties are achieved.

Further embodiments and advantages of the machine in accordance with the invention result from the dependent patent claims and from the description. The drawing shows further features of preferred embodiments of the invention and should be referred to additionally.

Other objects and advantages of the present invention will become apparent to those skilled in the art upon a review of the following detailed description of the preferred embodiments and the accompanying drawings.

IN THE DRAWINGS

Figure 2:
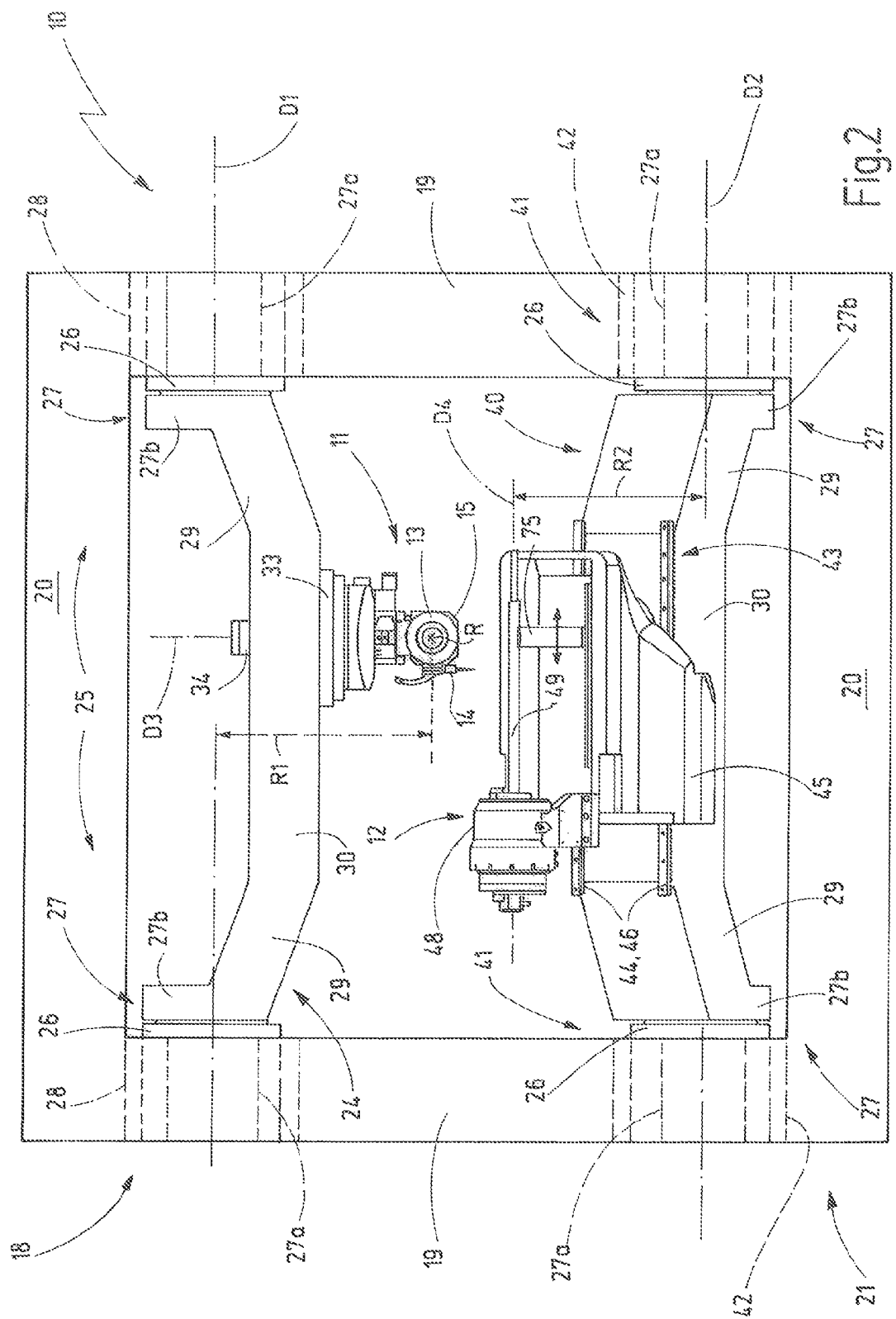
Figure 3:
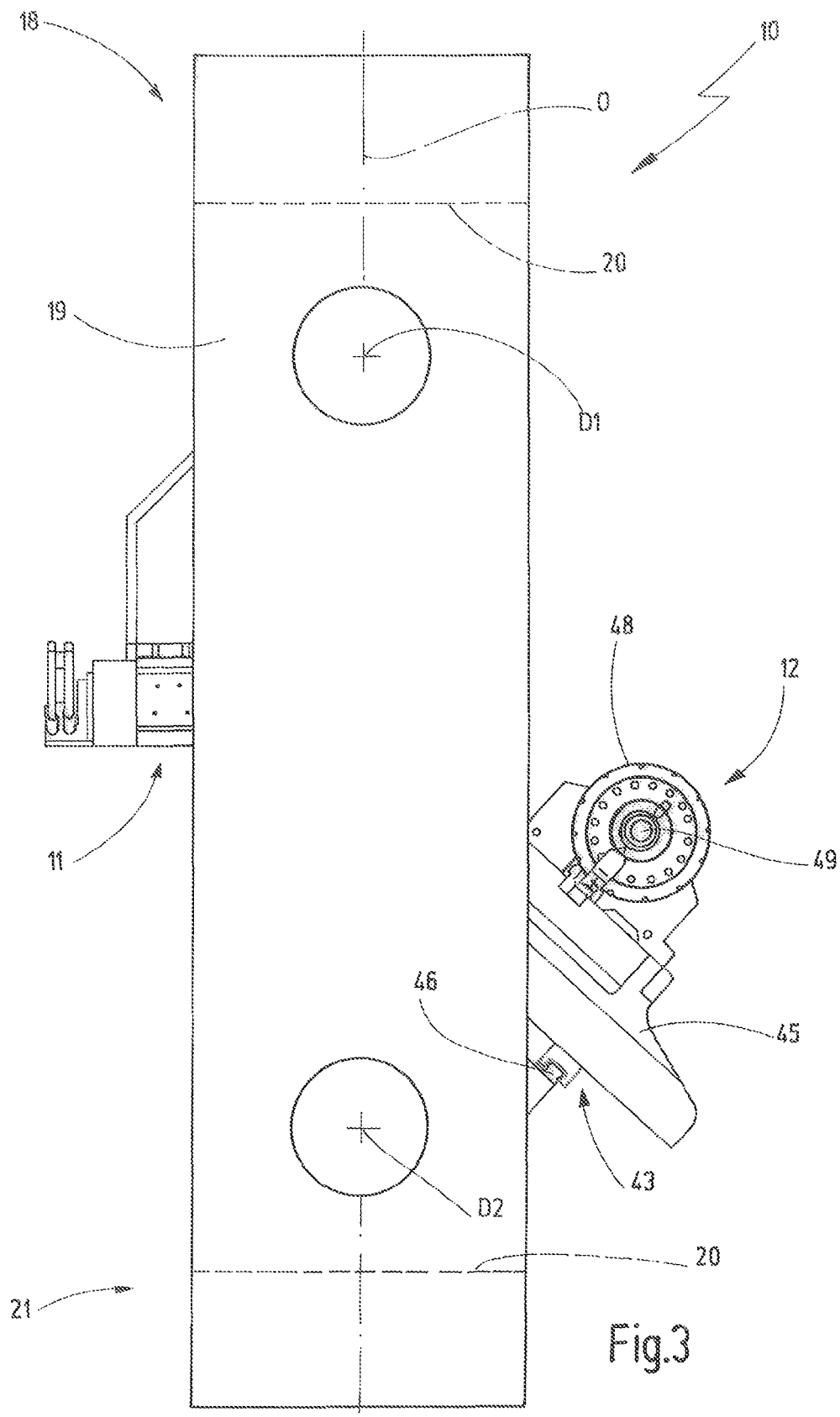
Figure 4:
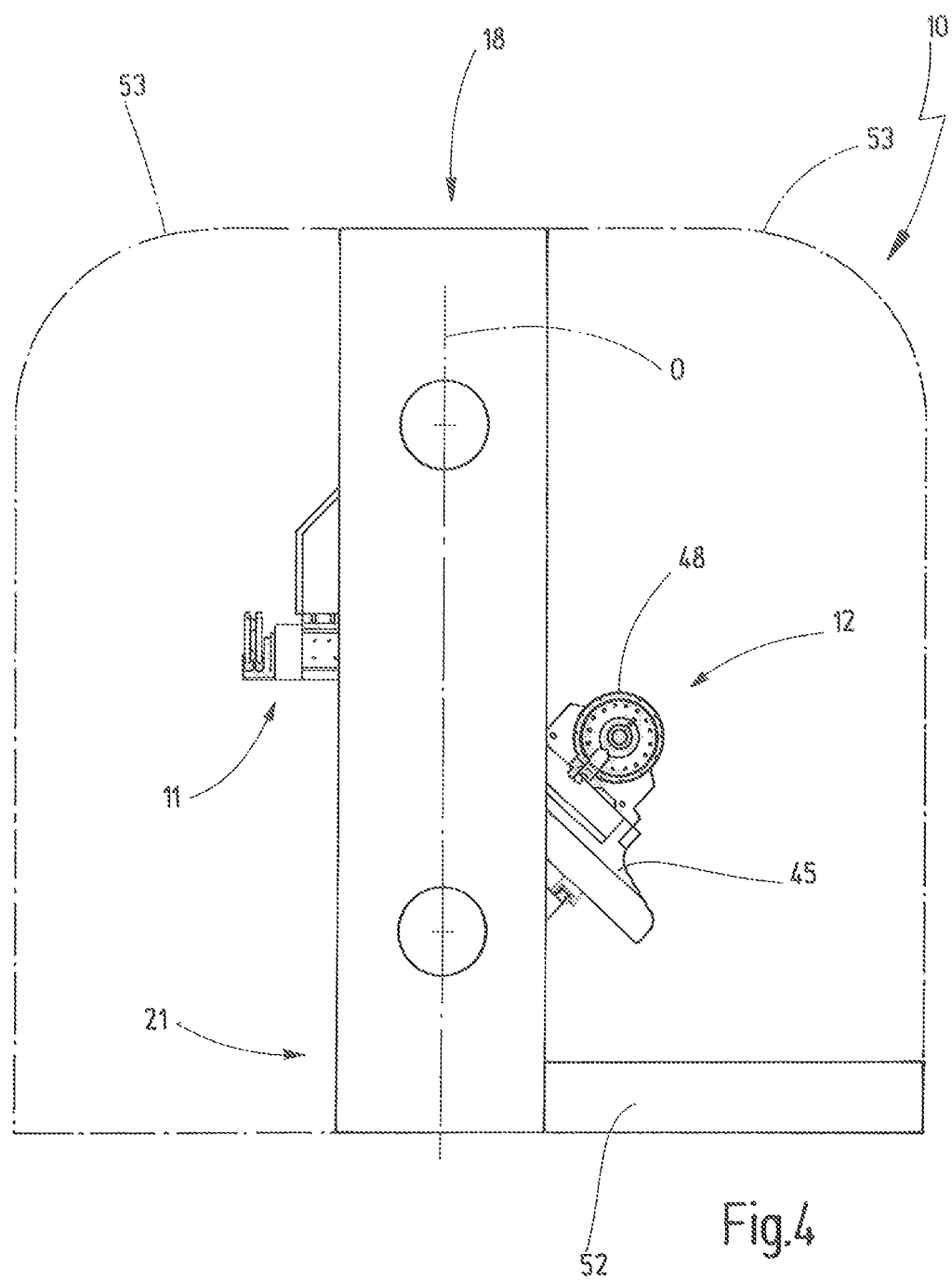
Figure 5:
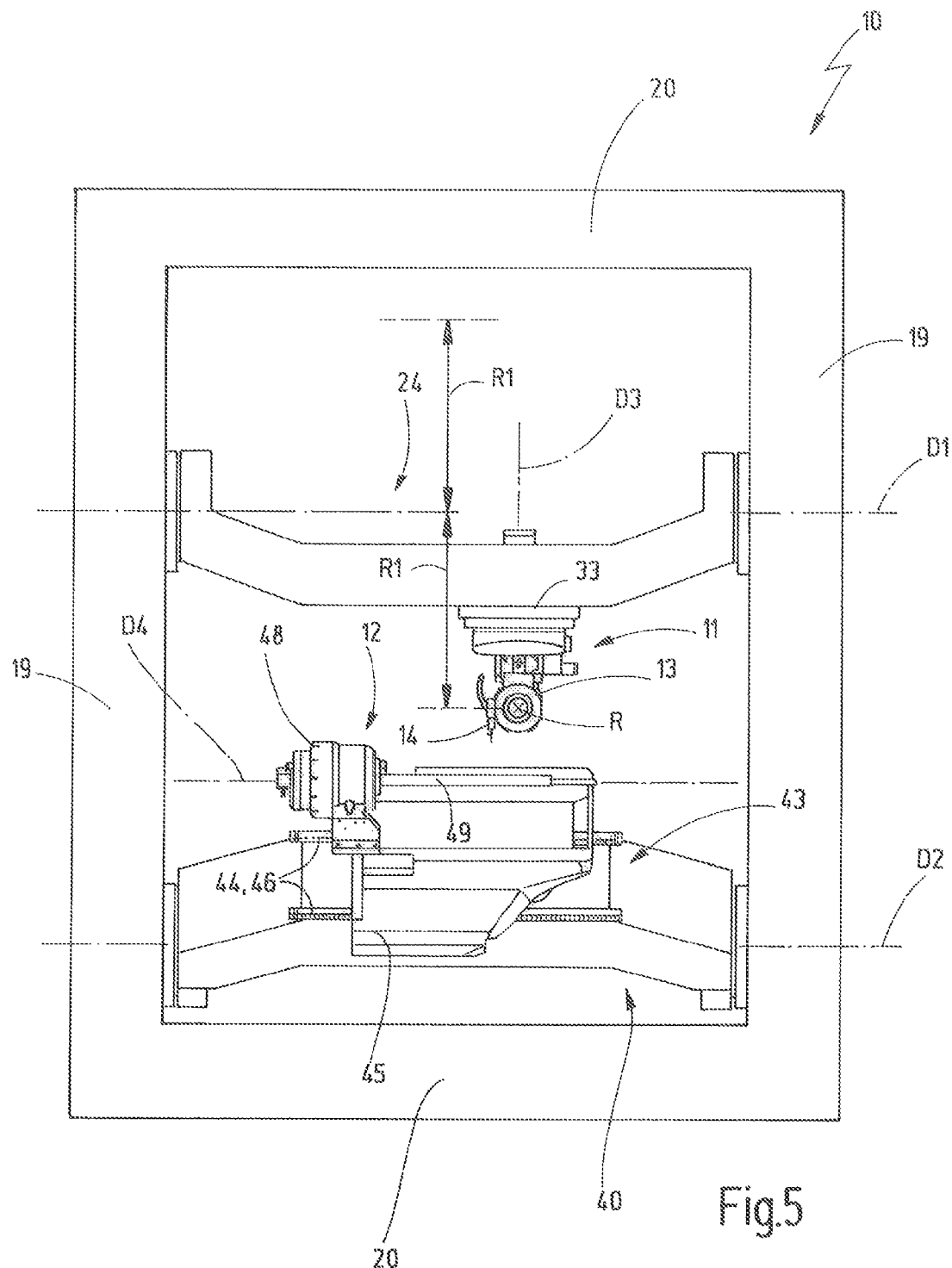
Figure 13:
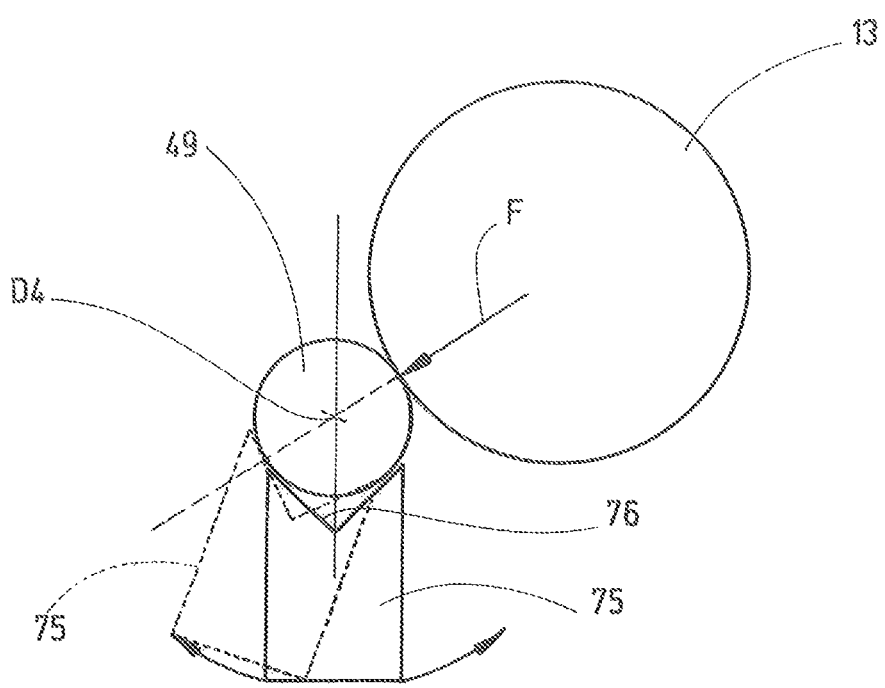

FIG. 1, a schematic and perspective illustration of a first embodiment of the machine, FIG. 2, a side view transverse to two rotational axes of the transverse members of the machine according to the first embodiment of FIG. 1, FIG. 3, another side view of the first embodiment of the machine according to FIGS. 1 and 2 in the direction of the two rotational axes, FIG. 4, a schematic illustration of the first embodiment of the machine shown in a side view in the direction of the two rotational axes of the transverse members, with a schematically illustrated machine bed and a cover, FIG. 5, a modified embodiment of the first embodiment of the machine, shown in side view transverse to the rotational axes of the transverse members, FIG. 6, a second embodiment of the machine in accordance with the invention in a perspective view, FIG. 7 a side view transverse to the rotational axes of the transverse members of the second embodiment of the machine according to FIG. 6, FIG. 8, another side view of the second embodiment according to FIGS. 6 and 7 in the direction of the rotational axes of the transverse members, FIG. 9, a perspective partial view of a transverse member of the machine with a parallelogram guide, FIGS. 10 to 12, block diagram-like illustrations of the principle of an apparatus for at least partial compensation of the changing torque with a torsion bar on a round guide of the transverse member, FIG. 13, a block diagram-like illustration of the principle of a pivoting steady rest for supporting the workpiece, FIG. 14, a machine module arrangement with a plurality of machines according to the foregoing figures, and FIG. 15, a further machine module arrangement with a plurality of modified machines which at least in part have only one transverse member.

DETAILED DESCRIPTION OF THE INVENTION

FIGS. 1 to 3 show a first embodiment of a machine 10 with a tool unit 11 and a workpiece clamping device 12. The machine 10 is, for example, a machine tool whose tool unit 11 has both a machining tool 13 and a measuring tool 14. The machining tool 13 is driven by the tool unit 11 to rotate about a rotational axis R, and can therefore also be called a rotation tool. The measuring tool 14 is fastened to a housing of the rotation drive 15 for the machining tool 13, and is for example designed in the form of a measuring probe. Its purpose is, for example, to permit determination of the relative positions of the machining tool and of a workpiece 49 to be machined. As an alternative to the embodiment illustrated, it is also possible to clamp the machining tool 13 in a fixed position on the tool unit 11, and to drive the workpiece 49 to rotate. The machine 10 can be, for example, a grinding machine or a lathe. Workpieces 49 with a cylindrical contour are machined in particular. The outer contour of the workpiece 49 is preferably rotationally symmetric to its longitudinal axis. For example, workpieces driven to rotate can be machined.

The machine 10 has a machine frame 18 which has two beams 19 aligned parallel to one another and which are joined together by at least one cross connector 20. In the drawing, the beams 19 and the cross connectors 20 are schematically drawn with rectangular forms. Their shape and contour can of course differ from this and may, for example, have recesses and reinforcing ribs.

In the preferred embodiment illustrated here, two cross connectors 20 are provided and are aligned substantially parallel and at a distance from one another. The two beams 19 and the two cross connectors 20 constitute a closed, ring-like frame. The frame has a rectangular or square contour. In the example, both the beams 19 and the cross connectors 20 extend in straight lines. In a variation of this, it is also possible for the beams 19 and/or the cross connectors 20 to include bends and/or offsets. The machine frame 18 is preferably arranged such that one of the cross connectors 20 is a part of a footer section 21 of the machine frame 18. In the position for use, the beams 19 extend substantially vertically upwards from the footer section 21, for example.

Alternatively, the beams 19 can also be aligned horizontally. The frame consisting of the beams 19 and the cross connectors 20 can here be arranged lying flat, so to speak. A plane, referred to as the orientation plane O and extending through the first and second rotational axes D1 and D2, can be arranged vertically, horizontally or obliquely to a horizontal plane.

In the embodiments of the machine 10 illustrated here, the first and the second rotational axes D1, D2 are aligned horizontally. It is furthermore possible for the first and second rotational axes D1, D2 to be arranged vertically or obliquely in the orientation plane O.

A first transverse member 24 extends between the two beams 19. The first transverse member 24 is rotatably mounted on the two beams 19 about a first rotational axis D1 by means of a first round guide 25. For this purpose, the first round guide 25 has two rotary bearings 26, by means of which one end section 27 of the first transverse member 24 is rotatably mounted on a beam 19. For this purpose, each end section has a bearing pin 27a associated with the rotary bearing 26. Furthermore, the round guide 25 is associated with a first rotary drive 28, which serves to rotate the first transverse member 24 about the first rotational axis D1.

The first rotary drive 28 can be arranged in a recess in one of the two beams 19, or can be fastened at the side to the beams 19 in question. The rotary drive 28 can have a hollow shaft motor that is arranged coaxially to the bearing pin. It is also possible to provide the first rotary drive 28 of the first transverse member 24 by two separate motors whose drives are coordinated, where each end section 27 is drive-connected to a motor. Ultimately this depends on the power required to rotate the first transverse member 24. A transmission can also be inserted between the first rotary drive 28 and the first transverse member in order to achieve a desired multiplication or reduction for the rotary movement of the first transverse member 24. The first rotary drive 28 preferably has at least one electric motor which can be designed for example as a servomotor or as a torque motor.

The two end sections 27 each have a flange 27b adjacent to the bearing pin 27a and extending substantially transversely to the first rotational axis. An intermediate section 29 extending obliquely to the first rotational axis D1 adjoins each of the two flanges 27b. The two intermediate sections 29 are connected to one another by a centre section 30 extending parallel to the first rotational axis D1. The centre section 30 is thus offset relative to the first rotational axis D1. The first transverse member 24 has the form of a bar or clamp. The two intermediate sections 29 and the centre section 30 between them form an offset structure.

The centre piece 30 of the first transverse member 24 is assigned to the tool unit 11. The tools 13, 14 are at a distance from the first rotational axis D1. For this reason, they perform a pivoting movement about the first rotational axis D1 when the first transverse member 24 is rotated about the first rotational axis D1. The distance to the first rotational axis D1 here predetermines a first pivoting radius R1 on which the tool 13, 14 moves about the first rotational axis D1. The first pivoting radius R1 is of different size for various tools 13, 14 or for various tool parts of the tool unit 11. A first pivoting radius R1 is drawn by way of example in FIG. 2 relative to the rotational axis R of the machining tool 13. With a rotating machining tool 13, the first pivoting radius R1 can also be determined at that point on the rotation track of the tool 13 which is at the greatest distance from the first rotational axis D1.

The tool unit 11 is rotatably mounted on the first transverse member 24 by a third round guide 33 about a third rotational axis D3 by a drive 34. The third round guide 33 is here connected to the centre section 30 of the first transverse member 24. The third rotational axis D3 extends at right angles, for example radially, to the first rotational axis D1. The third rotational axis D3 extends, offset from a central plane, between the two beams 19, so that the distances of the third rotational axis D3 from the two beams 19 are not equal. At a distance from the first rotational axis D1 and from the first cross piece 24, a second cross piece 40 is arranged between the two beams 19.

The second transverse member 40 is rotatably mounted on the machine frame 18 about a second rotational axis D2 by a second round guide 41. The second rotational axis D2 extends parallel to the first rotational axis D1. In particular, the distance between the two rotational axes cannot be changed. Like the first round guide, the second round guide 41 also has two rotary bearings 26 at which the second transverse member 40 is mounted on the beams 19. A second rotary drive 42 is also associated with the second round guide 41, and can be designed in the same way as the first rotary drive 28. The shape and the bearing of the second transverse member 40 correspond to those of the first transverse member 24, and reference is therefore made to the above description. The second transverse member 40 thus also has two end sections 27 with bearing pins 27a and flanges 27b, with intermediate sections 29 adjoining each of them, and a central section 30. In the embodiment, the two transverse members 24, 40 are of identical design. The first round guide 25 and the second round guide 41 are also identical, so that the number of identical parts in the machine 10 is very large. If the drive power permits, the two electric rotary drives 28, 42 can also be of identical design.

In the first embodiment of the machine 10, a longitudinal guide 43 is provided and is arranged on the second transverse member 40. The longitudinal guide 43 contains a guidance means 44 that extends parallel to the second rotational axis D2. A carriage 45 is arranged along the guidance means 44 and can be moved longitudinally on the second transverse member 40 by a drive, not shown in detail. In the embodiment, two guide rails 46 parallel to one another act as the guidance means 44. The two guide rails 46 are fastened to the central section 39 of the second transverse member 40. The workpiece clamping device 12 is fastened to the carriage 45 and is thus mounted such that it can be moved parallel to the second rotational axis D2 on the second transverse member 40. The workpiece clamping device 12 can be arranged on the side of the centre section 39 of the second transverse member 40 that faces the second rotational axis D2 or on the side that faces away.

As an alternative to the illustrated embodiment, the third round guide 33 could also be arranged on the carriage 45 and serve to rotate the workpiece clamping device 12 about the third rotational axis D3, which would then extend at right angles to the second rotational axis D2.

The workpiece clamping device 12 has a fourth round guide 48, by means of which a workpiece 49 held in the workpiece clamping device 12 can be rotated about a fourth rotational axis D4. The fourth rotational axis D4 extends parallel to the second rotational axis D2. A workpiece 49 held in a workpiece clamping device is arranged at a distance from the second rotational axis D2. When the second transverse member 40 rotates about the second rotational axis D2, the workpiece 49 performs a pivoting movement about the second rotational axis D2 on a second pivoting radius R2. The second pivoting radius R2 can, depending on the shape of the workpiece 49 at various locations on the workpiece, be of different sizes. In the case of workpieces 49 whose contours are cylindrical, the second pivoting radius R2 can be provided by the longitudinal axis of the workpiece 49.

The distance between the first and second rotary axes D1, D2 is smaller, by a specified difference, than the total of the minimum first pivoting radius R1 of the tools 13, 14, and the minimum second pivoting radius R2 of the workpiece. The value of the difference is greater than or at least equal to zero, and depends on the specific machining task.

For the positioning of the tool 13, 14 relative to the workpiece 49, it is necessary to determine its angular position or rotation angle α about the first or second rotational axis D1 or D2 in question. To do so, a rotation angle measurement means 55 as illustrated in an extremely schematic form in FIG. 1 is associated with the first round guide 25 and the second round guide 41 respectively. The rotation angle measurement means 55 has a transducer 56 which rotates together with the transverse member 24 or 40 about the rotational axis D1 or D2 respectively and which is arranged adjacent to a measuring element 57 having the shape of a partial ring and which moves along the measuring element 57 when the transverse member 24 or 40 rotates, such that the rotational position can, for example, be determined inductively. The larger the radius of the measuring element 57 having the shape of a partial ring and the distance of the transducer 56 from the respective rotational axis D1 or D2 in question, the greater the precision in the recording of the angular position of the tool 13, 14 relative to the first rotational axis D1 or of the workpiece 49 relative to the second rotational axis D2.

It is however satisfactory if the recording is accurate in the rotation angle working range in which machining or measurement takes place. For this reason, it is satisfactory if the measuring element 57 is designed as a partial ring and is only arranged in the relevant rotation angle working range at a large distance from the rotational axis D1 or D2 in question. For positioning outside this rotation angle working range, a conventional rotation angle sensor in the form of a small disc can for example be provided on the rotary drive 28 or 42 respectively.

In a variation from the embodiments illustrated, the two transverse members 24, 40 can also be rotatably mounted at one end only on a beam 19 and extend from this bearing to its free end.

The first embodiment of the machine 10 has only one longitudinal guide 43 and four round guides 25, 33, 41, 48. The machine 10 thus possesses a total of five machine axes. The two transverse members 24, 40 are exclusively rotatably mounted on the machine frame 18 about their rotational axes D1 or D2. The possibility of linear movement of the two transverse members 24, 40 relative to the machine frame 18 is not provided in this example.

In an alternative implementation, however, an adjusting unit for adjusting the distance between the first and second rotational axes D1, D2 can be provided. The adjusting unit is inactive during machining or measurement with the machine 10, so that the spacing between the rotational axes remains constant during measurement and/or machining of a workpiece 49. It is only used to set the machine up for a tool unit 11 currently being used and/or the workpiece 49 that is to be machined or measured with it. After setup, the adjusting unit for fixing the distance between the rotational axes is preferably locked, so that it cannot inadvertently change during operation of the machine and cause machining or measurement errors. An infeed movement between the tool 13, 14 and the workpiece 49 for measuring and/or machining respectively is not performed by the adjusting unit.

If an operator wishes to exchange or insert a tool 13, 14 or a workpiece 49, the transverse member 24 or 40 in question can be rotated about the respective rotational axis D1 or D2, so that the tool unit 11 or the workpiece clamping device 12 swings out between the two beams 19 and is held at a suitable height for the operator in order to permit fitting or removal of tools 13, 14 or workpieces 49. Since the frame-like machine frame 18 formed by the beams 19 and the cross connectors 20 is accessible from two sides, fitting or removal of tools 13, 14 and workpieces 49 is easy and ergonomic. An automated supply of workpieces or an automatic exchange of tools 13, 14 can also be implemented very easily thanks to the good accessibility of the frame-like machine frame 18.

The longitudinal guide 43 can, in a variation from the illustrated embodiment, be designed sealed, where a bellows unit is used, for example. The drive for the longitudinal guide 43 can in particular be protected against the ingress of chips and coolant by a suitable sealing measure. Since longitudinal guides on metal-removing machines require sealing measures to be taken, the machine 10 has only one longitudinal guide 43. All other guides and machine axes are designed as round guides.

The first embodiment of the machine 10 is illustrated in FIG. 4. A machine bed 52 is arranged at the footer section 21 of the frame-like machine frame 18. The machine bed 52 does not perform any supporting function, and can therefore have very small dimensions. In the embodiment, the machine bed 52 serves in particular to trap metal chips and coolant liquid. It can therefore be arranged as a sump in the area of the lower cross connector 20. The machine bed 52 can be arranged on one or both open sides of the frame-like machine frame 18. At the machine frame 18 or at the machine bed 52, a cover 53, which is only illustrated schematically by a dotted line in FIG. 4, can also be provided on both open sides of the machine frame 18. With the aid of the cover 53, the machine 10 can be completely enclosed during operation in order to protect operating personnel. The cover 23 can have one or more access openings that can be closed by doors or flaps in order to ensure accessibility from one or both sides of the machine frame.

A further variation of the first embodiment of the machine 10 is illustrated in FIG. 5. The angular range through which the first transverse member 24 can pivot about the first rotational axis D1 has here been increased to 360 degrees. The first transverse member 24 with the tool unit 11 can therefore be moved in a full circle around the first rotational axis D1. The distance of the cross connector 20 arranged adjacent to the first rotational axis D1 is chosen to be large enough for this purpose. In a further variation, the angular range could also be enlarged in which the second transverse member 40 is rotatable about the second rotational axis D2 if the distance between the second rotational axis D2 and the cross connector 20 adjacent to the second rotational axis is appropriately enlarged. In the preferred embodiments, the two transverse members 24, 40 can rotate at least through an angle of 180 degrees about the respective rotational axes D1 and D2. Depending on the application, larger or smaller angular ranges may also be provided for the corresponding rotational movements of the transverse members 24, 40. In other respects, the modified embodiment according to FIG. 5 corresponds to the first embodiment according to FIGS. 1 to 3, and reference is therefore made to the associated description.

A second embodiment of the machine 10 is illustrated in FIGS. 6 to 8. Identical elements are marked with the same reference numbers as in the embodiment according to FIGS. 1 to 5. Therefore only the differences from the first embodiment and its modifications are explained below. In all other respects, reference is made to the above description of the first embodiment according to FIGS. 1 to 3 and its modifications according to FIGS. 4 and 5.

The crucial difference of the second embodiment from the first embodiment is that the longitudinal guide 43 of the machine 10 is arranged on the first transverse member 24, and hence between the transverse member 24 and the tool unit 11. In the second embodiment, therefore, the tool unit 11 can move longitudinally in the direction of the first rotational axis D1. The workpiece clamping device 12, on the other hand, is arranged in a fixed position on the second transverse member 40, such that the workpiece 49 is only rotatably mounted on the second transverse member 40 by the fourth round guide 48 about the fourth rotational axis D4.

The guide rails 46 and the carriage 45 that is movably mounted on them are thus arranged on the central section 30 of the first transverse member 24. The third round guide 33, by means of which the tool unit 11 is arranged rotatably about the third rotational axis D3, sits on the carriage 45. In all other respects, the second embodiment according to FIGS. 6 to 8 corresponds to the first embodiment of the machine 10. The modifications to the first embodiment illustrated in FIGS. 4 and 5 can also be provided on the second embodiment of the machine 10.

If the first rotational axis D1 or the second rotational axis D2 is aligned horizontally, the torque changes depending on the angle of rotation $\alpha$, as is noted on the example of the first transverse member 24 in FIG. 10. If the first transverse member 24 is located in a rotary position with an angle of rotation $\alpha=0$ or $\alpha=180°$, then it is oriented vertically, and the torque about the first rotational axis D1 resulting from the load of the transverse member 24 and of the tool unit 11 arranged thereon is equal to zero. At other angles of rotation $\alpha$, the torque about the first rotational axis D1 increases, and is at a maximum when the angle of rotation $\alpha=90°$.

When positioning the first transverse member 24 about the first rotational axis D1, the first rotary drive 28 must apply this torque continuously, which represents a high energy requirement. For this reason, in one embodiment an apparatus 60 is provided which compensates at least in part for this torque over an angular range $0°<\alpha<180°$. For example, a counterweight could be provided diametrically opposite the tool unit 11 relative to the first rotational axis D1. The apparatus 60 could also be implemented by spring arrangements. In the embodiment, the apparatus 60 has a torsion bar 61 which is fastened at one end 62 such that it cannot rotate on the machine frame, for example to a beam 19, and which is connected to another end 63 such that it cannot rotate relative to the first transverse member 24, as is illustrated schematically in FIG. 11. When the transverse member 24 rotates about the first rotational axis D1, the torsion bar 61 is twisted, and can as a result compensate at least in part for the torque about the first rotational axis D1 caused by the weight of the first transverse member 24 or of the tool unit 11. The apparatus 60 could also have a plurality of torsion bars 61.

In a variation of the embodiment according to FIG. 11, it is possible for the torsion bar 61 not to be fixed at one end 62 or at another end 63, but to be rotatably mounted relative to the beam 19 or to the first transverse member 24. In FIG. 12, this is illustrated schematically on the basis of the first end 62 and the beam 19. In a specified angular range about the first rotational axis D1, the torsion bar 61 is surrounded by a recess 64, into which a radial projection 65 of the torsion bar 61 protrudes. The recess 64 is bounded by two stop surfaces 66 in a circumferential direction about the first rotational axis D1. If the torsion bar 61 is rotated in an angular range about the first rotational axis D1 in which the radial projection 65 can move freely inside the recess 64, the torsion bar 61 exerts no torque. Only when the radial projection 65 contacts one of the two stop surfaces 66 is the torsion bar 61 twisted by a further rotation of the first transverse member 24 about the first rotational axis D1, generating a torque which opposes as a counter-torque the torque caused by the weight of the first transverse member 24 and of the tool unit 11. The recess 64 and the position of the stop surfaces 66 can define the range within which the torsion bar 61 is twisted, as well as a range in which no torsion is created in the torsion bar 61. It is also possible to provide a plurality of torsion bars 61 with different ranges with and without torsion.

Clearly an apparatus 60 of this sort can be provided both for the first transverse member 24 and for the second transverse member 40.

A further modification of the embodiments described previously is illustrated in FIG. 9. A parallelogram guide 70 is provided there for the first transverse member 24. The parallelogram guide 70 serves to keep the inclination of the tool unit 11 constant relative to a horizontal plane during rotation of the first transverse member 24 about the first rotational axis D1.

In the embodiment, the central section 30 of the first transverse member is for this purpose rotatably mounted relative to the two intermediate sections 29 about an axis parallel to the first rotational axis D1. At the central section 30, two parallel struts 71 engage, the opposite ends of each of which are connected to an auxiliary transverse member 72. The auxiliary transverse member 72 is rotatably mounted on the two beams 19 of the machine 10, where the rotational axis DH of the auxiliary transverse member 71 extends parallel to the first rotational axis D1. The two struts 71 can rotate relative to the auxiliary transverse member 72, where the locations of the rotary bearings of the struts 71 on the auxiliary transverse member 72 are at the same distance from the rotational axis DH of the auxiliary transverse member 72 as are the locations of the rotary bearings between the central section 30 and the intermediate sections 29 on the first transverse member 24 relative to the first rotational axis D1. The struts 71 are rigidly connected to the central section 30 of the first transverse member 25 on which the tool unit 11 is seated. The intermediate sections 29 of the first transverse member 24 can rotate relative to the struts 71 and the central section 30. When the first transverse member 24 rotates or pivots around the first rotational axis D1, the parallelogram guide 70 ensures that a specified inclination of the central section 30 of the first transverse member 24, on which the tool unit 11 is seated, remains constant relative to a horizontal plane. In the embodiment, the rotational axis R about which the machining tool 13, for example a grinding disc, is driven to rotate, in this way always remains at the same inclination angle relative to a horizontal plane. For example, the rotational axis R can always be aligned parallel to a horizontal plane.

Such a parallelogram guide 70 can obviously also be provided, alternatively or additionally, for the second transverse member 40.

It may be necessary with longer workpieces for these to be supported against the force F that the tool 13, 14 exerts on the workpiece 49, with the aid of, for example, a steady rest 75. A steady rest 75 is illustrated only schematically in FIG. 2. The steady rest 75 can be arranged on a carriage 45 that can move in the direction of extension of the workpiece 49, such that the steady rest 75 always supports the workpiece 49 at the point where the machining tool 13 is engaging with it. As an alternative to a longitudinally movable steady rest 75, it can also be joined rigidly to the second transverse member 40, so that when the carriage 45 moves longitudinally, a relative movement of the workpiece 49 relative to the steady rest 75 occurs automatically. A steady rest 75 of this sort can be provided for all of the embodiments, and is only illustrated on FIG. 2 by way of example.

In addition to the longitudinal movability of the steady rest 75, the latter may also be arranged such that it can pivot about the longitudinal axis of the workpiece 49 or about the fourth rotational axis D4, as can be seen schematically in FIG. 13. As a result of the pivoting movement of the tool 13 about the first rotational axis D1 and of the workpiece 49 about the second rotational axis D2, the place where the workpiece 49 and the tool 13 engage can change during machining. The workpiece 13 here exerts a force F on the workpiece 49. As long as the direction of this force F is oriented in such a way that it is pointing into the prism-shaped recess 76 of the steady rest 75 that partially receives or supports the workpiece 49, the workpiece 49 remains inside the prism-shaped recess 76 and is supported by the steady rest 75. If however the resultant force F points in a direction that is no longer into the prism-shaped recess 76, there is a risk that the workpiece 49 will slip out of the recess 76 of the steady rest 75. To prevent this, the steady rest 75 is arranged in one advantageous embodiment of the machine 10 such that it can pivot about the longitudinal axis of the workpiece and, as in the example, about the fourth rotational axis D4, and can thus always be pivoted about this axis in such a way that the resultant force F points into the prism-shaped recess 76, so that the workpiece 49 is supported against the machining force F of the tool 13.

FIGS. 14 and 15 show embodiments of machine module arrangements 80. In the first embodiment of the machine module arrangement 80 according to FIG. 14, a plurality of machines 10 are arranged adjacently, so that the rotational axes D1, D2 of the transverse members 24, 40 are aligned parallel to one another. The machine frames 18 are arranged here directly next to one another or at a small distance, so that the tool 13, 14 of the machine 10 can engage in the contour of the machine frame 18 of an adjacent machine 10. As a result it is for example possible for the workpieces 49 to be transferred between two adjacent workpiece clamping devices 12 and for workpiece machining to be carried out in the machines 10 of the machine module arrangement 80 as it were step-by-step. If necessary, a gripper or a similar transfer unit can be arranged for transferring workpieces between two machines 10.

It is also possible to select the distance from the first rotational axis D1 to a second rotational axis D2 of a directly adjacent machine 10 in such a way that measurement and/or machining of the workpiece 49 in the workpiece clamping device 12 of the machine 10 by the tool 13, 14 of the adjacent machine 10 of the machine module arrangement 80 is permitted. In this way, it also becomes possible to machine or to measure a workpiece 49 in one setup by tools 13, 14 of adjacent machines 10. There is no limit in principle to the number of machines 10 combined to one machine module arrangement 80.

In a variation of the machine module arrangement 80 shown schematically in FIG. 14, a workpiece supply unit 81 can be assigned to a machine 10 acting as an input module and a workpiece removal unit 82 can be assigned to a machine 10 acting as an output module, as is also illustrated schematically in the embodiment according to FIG. 15.

FIG. 15 shows a second embodiment of the machine module arrangement 80. This machine module arrangement 80 has one or more modified machine modules 10a having only a first transverse member 24 or only a second transverse member 40. In the embodiment shown in FIG. 15, the machine modules 10a each only have a second transverse member 40. In this machine module arrangement 80, the machine frames 18 are arranged next to one another in such a way that each two adjacent machine frames 18 or machine modules 10, 10a have at least one first transverse member 24 and at least one second transverse member 40.

In the example illustrated in FIG. 15, only a first transverse member 24 is provided on one module, and is associated with both the second transverse member 40 of the machine 10 of this module and with the two second transverse members 40 of each of the directly adjacent machine modules 10a. The tool 13, 14 that is provided on the first transverse member 24 can therefore be used to machine or measure workpieces 49 of the same module and of the directly adjacent modules 10a. In a variation of the illustrated embodiment, a machine module with only a first transverse member 24 can be arranged instead of the machine 10 between the two machine modules 10a. In principle, differently configured machine modules 10, 10a with a first transverse member 24 and/or a second transverse member 40 can be combined in any way. At least the machine modules 10a or machines 10 are arranged next to one another in such a way that machine frames 18 or modules 10, 10a arranged directly adjacently alternatingly have at least a first transverse member 24 and at least a second transverse member 40. For example, every second machine module 10a could have a second transverse member 40, and the machine modules 10a arranged between them each have a first transverse member 24. Any number of modules can be chosen.

In the case of both machine module arrangements 80 it is possible to successively perform different machining processes, and in particular different grinding processes, in different machines 10 or machine modules 10a. For example, what is known as a centerless grinding process can be carried out in a machine 10 or a machine module 10a, while a cylindrical grinding process is performed on the workpiece 49 in one or both of the neighbouring modules 10a or in one or both of the neighbouring machines 10. In order to facilitate easy combination of machines 10 and/or machine modules 10a, the machine frames 18 preferably have the same height and, according to the example, the same height and the same width measured in the direction of the transverse members.

The invention relates to a machine 10, in particular a machine tool. The machine 10 has a frame-shaped machine frame 18 made of two beams 19 and two cross connectors 20 connecting said beams. Two transverse members 24, 40 are each rotatably mounted on the beam 19 between the two cross connectors 20 via a round guide 25 or 41 respectively. The first transverse member 24 can be rotated exclusively about the first rotational axis D1 and is otherwise stationary. The second transverse member 40 can be rotated exclusively about a second rotational axis D2 and is otherwise stationary. The two rotational axes D1, D2 are parallel to one another. A tool unit 24 is arranged on the first transverse member 24. A workpiece clamping device 12 is arranged on the second transverse member 40. One of the two transverse members 24, 40 has a longitudinal guide 43 such that either the tool unit 11 or the workpiece clamping device 12 is arranged so as to be guided in a longitudinally movable manner on the transverse member 24, 40 in question. The longitudinal guide 43 allows a linear displacement of the tool unit 11 or of the workpiece clamping device 12 parallel to the rotational axes D1, D2. No additional longitudinal guides are provided. The machine 10 has a particularly space-saving machine frame 18. The frame-shaped machine frame 18 is sufficiently rigid and provides good accessibility to the tool unit 11 and to the workpiece clamping device 12 from two sides.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

LIST OF REFERENCE NUMBERS

10 Machine
11 Tool unit
12 Workpiece clamping device
13 Machining tool
14 Measuring tool
15 Rotary drive
18 Machine frame
19 Beam
20 Cross connectors
21 Footer section
24 First transverse member
25 First round guide
26 Rotary bearing
27 End section
27a Bearing pin
27b Flange
28 First rotary drive
29 Intermediate section
30 Central section
33 Third round guide 33
34 Drive
40 Second transverse member
41 Second round guide
42 Second rotary drive
43 Longitudinal guide
44 Guidance means
45 Carriage
48 Fourth round guide
49 Workpiece
52 Machine Foundation
53 Cover
55 Rotation angle measurement means
56 Transducer
57 Measuring element
60 Apparatus
61 Torsion bar
62 End
63 End
64 Recess
65 Radial projection
66 Stop surface
70 Parallelogram guide
71 Strut
72 Auxiliary transverse member
80 Machine module arrangement
81 Workpiece supply unit
82 Workpiece removal unit
75 Steady rest
76 Prism-shaped recess
D1 First rotational axis
D2 Second rotational axis
D3 Third rotational axis
D4 Fourth rotational axis DH Rotational axis of auxiliary transverse member
F Force
O Orientation plane
R Rotational axis
R1 First pivoting radius
R2 Second pivoting radius

I claim:

1. Machine for machining and/or measuring a workpiece (49),
having a machine frame (18),
having a first transverse member (24) which is rotatably mounted by means of a first round guide (25) about a first rotational axis (D1) on the machine frame (18) and on which a tool unit (11) with a tool (13, 14) is arranged, where the tool (13, 14) is arranged at a distance from the first rotational axis (D1),
having a second transverse member (40) which is rotatably mounted by means of a second round guide (41) about a second rotational axis (D2) on the machine frame (18), and on which a workpiece clamping device (12) is arranged at a distance from the second rotational axis (D2);
where the two rotational axis (D1, D2) are aligned parallel to one another;
characterized in that either a longitudinal guide (43) for the tool unit (11) is arranged on the first transverse member (24) or a longitudinal guide (43) for the workpiece clamping device (12) is arranged on the second transverse member (40).

2. Machine according to claim 1,
characterized in that it is a processing machine particular a grinding machine.

3. Machine according to claim 1,
characterized in that the first rotational axis (D1) and the second rotational axis (D2) are at an unchanging distance from one another.

4. Machine according to claim 1,
wherein the longitudinal guide (43) has a guidance means (44, 46) extending substantially parallel to the rotational axis (D1, D2) of the transverse member (24, 40); and
further comprising a carriage (45) that can move along the guidance means (44, 46).

5. Machine according to claim 1,
characterized in that the tool unit (11) is rotatably arranged on the first transverse member (24) by means of a third round guide (33) about a third rotational axis (D3).

6. Machine according to claim 1,
characterized in that the third rotational axis (D3) extends substantially at a right angle to the first rotational axis (D1).

7. Machine according to claim 1,
characterized in that the third rotational axis (D3) extends along a center section (30) of the first transverse member (24).

8. Machine according to claim 1,
characterized in that the first transverse member (24) and/or the second transverse member (40) can pivot about the respectively associated rotational axis (D1, D2) through at least an angular range of 180 degrees.

9. Machine according to claim 1,
characterized in that the machine frame (18) comprises two beams (19) at a distance from one another, on which the two transverse members (24, 40) are rotatably mounted.

10. Machine according to claim 9,
characterized in that the machine frame (18) has two cross connectors (20) which connect together the two beams (19).

11. Machine according to claim 1,
characterized in that the first transverse member (24) is arranged above the second transverse member (40).

12. Machine according to claim 1,
characterized in that the first transverse member (24) and the second transverse member (40) are of identical design.

13. Machine according to claim 1 further comprising a plurality of machines (10) are arranged in adjacent relationship;
wherein each of the machines (10) of the plurality has a first rotational axis (D1) and a second rotational axis (D2); and
wherein the rotational axes (D1, D2) of the machines (10) of the plurality are aligned parallel to one another.

14. Machine according to claim 1,
characterized in that the third rotational axis (D3) is offset from a central plane between the two beams 19, so that the distances of the third rotational axis D3 from the two beams 19 are not equal.

15. Machine for machining and/or measuring a workpiece (49),
having a machine frame (18),
having a first transverse member (24) which is rotatabiy mounted by means of a first round guide (25) about a first rotational axis (D1) on the machine frame (18) and on which a tool unit (11) with a tool (13, 14) is arranged, where the tool (13, 14) is arranged at a distance from the first rotational axis (D1),
having a second transverse member (40) which is rotatably mounted by means of a second round guide (41) about a second rotational axis (D2) on the machine frame (18), and on which a workpiece clamping device (12) is arranged at a distance from the second rotational axis (D2);
where the two rotational axis (D1, D2) are aligned parallel to one another;
characterized in that either a longitudinal guide (43) for the tool unit (11) is arranged on the first transverse member (24) or a longitudinal guide (43) for the workpiece clamping device (12) is arranged on the second transverse member (40);
characterized in that the tool unit (11) is rotatably arranged on the first transverse member (24) by means of a third round guide (33) about a third rotational axis (D3); and
characterized in that the workpiece clamping device (12) has a fourth round guide (48) about a fourth rotational axis (D4) which extends substantially parallel to the second rotational axis (D2).

* * * * *